Patented Feb. 17, 1953

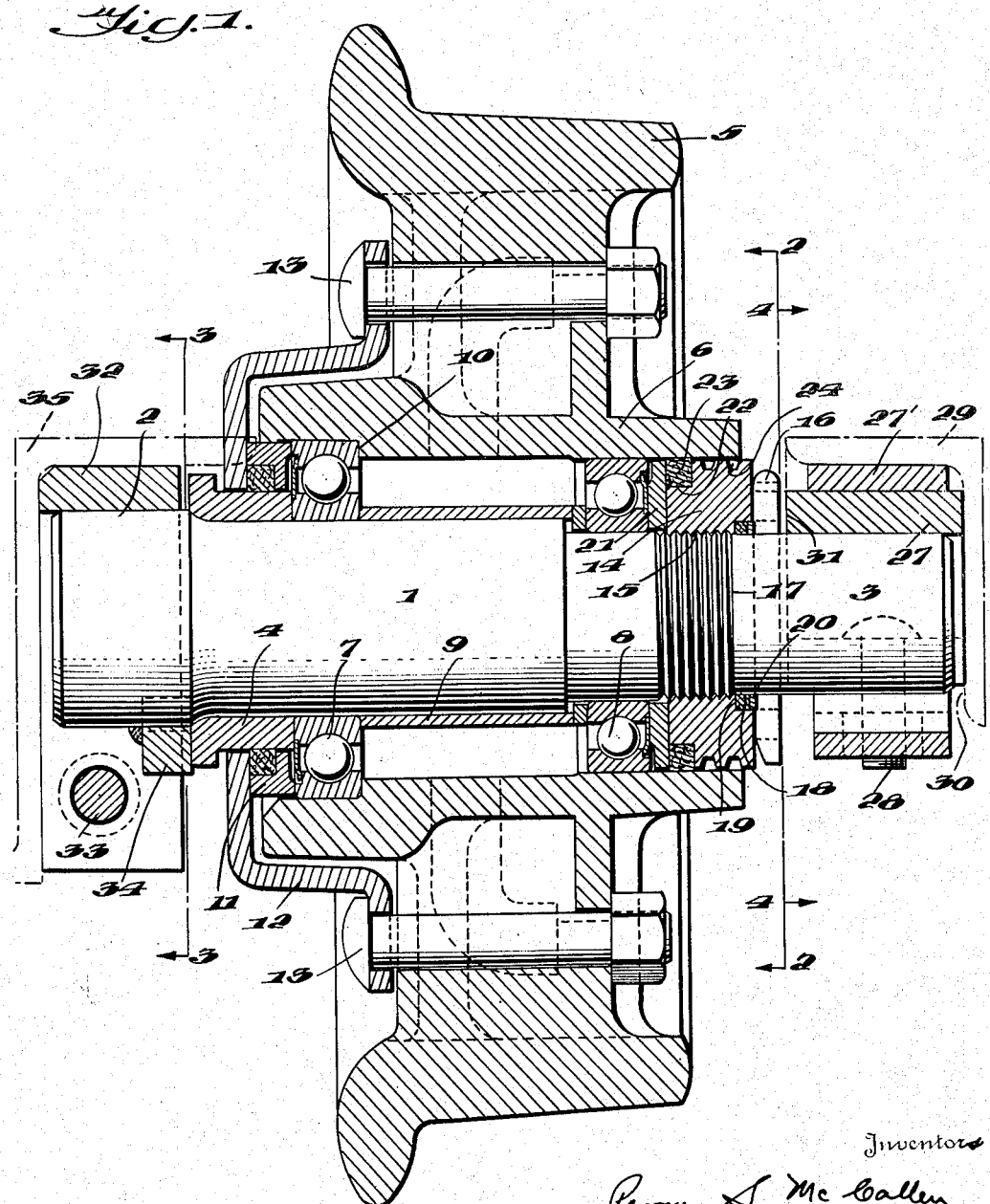

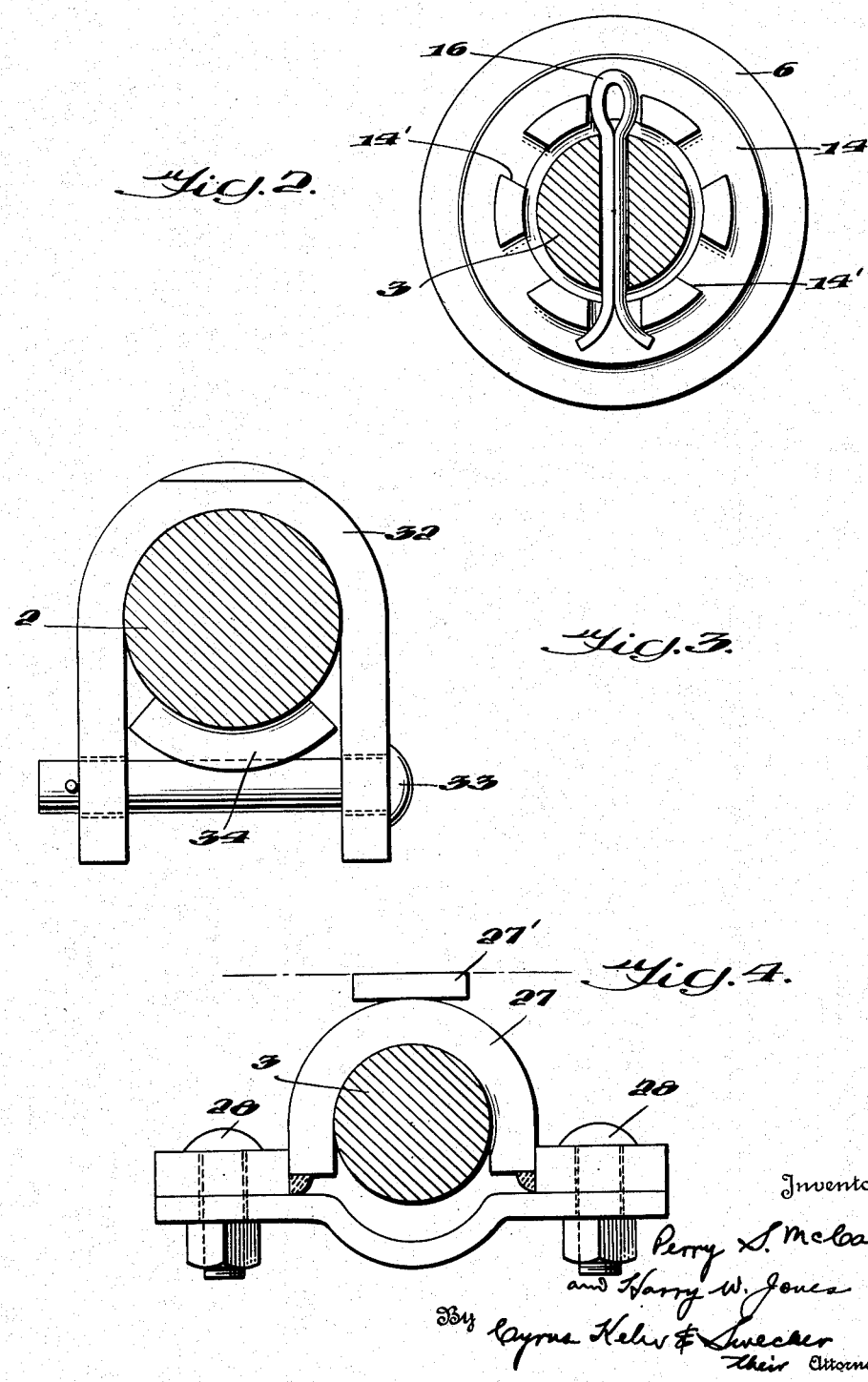

2,628,859

UNITED STATES PATENT OFFICE 2,628,859

WHEEL AND AXLE ASSEMBLY

Perry S. McCallen and Harry W. Jones, Knoxville, Tenn., assignors to Sanford Investment Company, Wilmington, Del., a corporation of Delaware Original application February 24, 1945, Serial No. 579,546. Divided and this application September 24, 1947, Serial No. 775,850

2 Claims. (Cl. 295—49)

1

This application is a division of our prior application for Wheel and Axle Assemblies, filed February 24, 1945, Serial No. 579,546, now abandoned.

This invention relates to an improvement in wheel and axle assemblies, particularly of the character of stub axles mounted in bearing boxes, such as are used in some types of mine cars.

In stub axle assemblies used heretofore, the outward thrust of the axle has been taken generally by the pressure of the axle against the inner wall of the pedestal box that encloses the outer end of the axle, which pedestal box is fastened to the longitudinal side sill that extends along the car outside of the wheel. When the outward thrust is taken by the pedestal box in this manner, the nut that confines the wheel on the axle is subjected to the thrust of the wheel and imposes the thrust in turn on the threads of the axle. This pressure on the threads has had a tendency to loosen the threads and cause wear.

One object of this invention is to prevent this endwise thrust of the wheel from being imposed on the threads and to cause it to be directed against the pedestal box itself, directly from the nut.

This is accomplished by locating the end of the nut closer to the pedestal box than the outer end of the axle to the adjacent inner wall of the pedestal box that encloses said outer end of the axle. Thus, the outward pressure against the wheel that would impose an endwise thrust thereto, would cause engagement of the nut against the face of the pedestal box before the end of the axle engages the inner face of the pedestal box, whereby the thrust of the wheel would be transmitted through the nut directly to the pedestal box and would not impose endwise thrust on the threads. The pressure of the wheel on the nut in an outward direction is limited to the force necessary to move the axle sufficiently to carry the nut against the hub of the pedestal box. As soon as the hub and nut contact each other, any further pressure tending to force the wheel in an outward direction would impose a pressure on the pedestal box rather than on the threads of the nut and axle.

The nut usually employed for confining the wheel on the axle, ordinarily is exposed to the mine water which is usually very acid. Since the nut is castellated ordinarily, the water has an opportunity to enter the threads between the nut and the axle. This acid water causes the threads to be rapidly eaten by the acid, causing the axle and the nut to be unfit for service.

2

A further object of this invention is to improve the construction of the wheel and axle assembly by protecting the threads against the entrance of mine water thereto without, however, closing the end of the wheel hub, and thus leaving the nut exposed for access in securing the hub on the axle.

This object is accomplished, in the preferred embodiment of the invention, by a packing washer which surrounds the axle at the outer side of the threads between the axle and the nut, in an assembly that will protect the threads effectively against the entrance of the acid water from the mine thereto.

Still another object of the invention is to provide an effective packing about the periphery of the nut that will prevent the entrance of mine water to the inner side of the nut between the nut and the wheel hub. This is made possible by utilizing a packing at the inner side of the nut between the latter and the hub, which packing may be combined with labyrinth grooves in the periphery of the nut for preventing effectively the entrance of water and foreign substances between the nut and the hub.

The preferred embodiment of the invention is illustrated in the accompanying drawings in which:

Fig. 1 is a vertical sectional view through the wheel assembly showing the axle in elevation;

Fig. 2 is a cross section through the axle on the line 2—2 of Fig. 1, and showing a portion of the wheel in elevation;

Fig. 3 is a similar view on the line 3—3 of Fig. 1, showing the inner pedestal box in elevation; and Fig. 4 is a similar view on the line 4—4 of Fig. 1, showing the outer pedestal box.

Referring to Fig. 1, the stub axle is designated generally by the numeral 1. The axle 1 has an enlarged inner end 2 and a reduced outer end 3. A collar 4 surrounds the axle adjacent the inner end thereof and is fixed on the axle.

The wheel is designated generally at 5, having a hub 6 surrounding the axle 1. The hub 6 is journaled on ball bearings 7 and 8 on the axle, the axle races of which ball bearings are separated by a sleeve 9. The hub race of the bearings 8 is free floating in the hub, while the hub race of the bearings 7 abuts against a shoulder 10 where it is confined by a ring 11. The ring 11 is in turn held in place by a pressure cap 12 secured by adjustable bolts 13 that extend through the web or spokes of the wheel. The wheel construction and the manner in which it is journaled on the axle in so far as these are described above, are substantially the same as set forth in the patent to Perry E. Moore, No. 2,112,859, granted April 5, 1938.

The wheel is confined on the axle by a nut 14 which is telescoped into the outer end of the hub 6, which hub is open at the outer side of the wheel. The nut 14 is threaded onto threads 15 on the intermediate portion of the axle 1, inwardly of the end portion 3 of said axle. The nut is castellated at its outer face at 14' and is confined against turning on the threads 15 by means of a split cotter pin 16, extending through an opening in the axle 1.

Between the intermediate portion of the axle 1 and the reduced outer end 3 is a small shoulder 17, where the threads 15 terminate, said threads being formed on the slightly enlarged intermediate portion of the axle. A packing ring 18 surrounds the end portion of the axle 3 against the shoulder 17, outwardly of the threads 15. This packing ring preferably is a felt washer which is seated in an annular groove 19 formed in the inner side of the nut 14 at the outer face of the body portion of the nut. The packing ring 18 is held in place by a washer 20, preferably of steel or hard metal, which is interposed between the packing ring and the cotter pin 16.

The felt packing ring is thus confined by the cotter pin and washer between the inner portion of the nut and the periphery of the axle, overlapping the outer end of the threads 15. Since the nut, the washer, the cotter pin, the felt and the axle all move together during any slight rotation that may take place, there is no tendency for the felt to be worn by friction. Therefore, it will continue to protect the screw connection between the nut and the axle against the entrance of the acid mine water thereto, thus greatly prolonging the period of service of the axle and nut before replacement may be necessary.

The nut 14 is separated from the hub race of the bearings 8 by a washer 21. Adjacent the washer 21, is an annular groove 22 in the peripheral face of the nut 14 at the inner side thereof, with a packing ring 23 seated in said groove 22 between the nut and the adjacent face of the washer 21. This packing ring 23 is formed preferably of a felt washer, filling the space between the groove 22 and the inner face of the wheel hub 6. The periphery of the nut 14 is formed also with labyrinth grooves 24 between the felt washer 23 and the outer end of the hub. The felt packing 23 is fixed to the axle and nut 14, to which the washer 21 that also confines the felt packing, is likewise fixed. Thus movement relative to this felt washer would take place only at the periphery of the latter where it bears against the rotating inner face of the hub 6. Coacting with the labyrinth grooves 24, the felt washer will thus contribute materially in preventing the entrance of water or other foreign substance into the wheel hub to the inner side of the nut, as well as to confine lubricant in the chamber in the hub.

At the outer side of the wheel, the reduced end 3 of the axle is mounted loosely and slidably in a pedestal box 27, capable of endwise movement relative thereto. The pedestal box 27 is in the form of a clamp that embraces the end portion 3 loosely and is detachably secured thereon by bolts 28. The outer end of the pedestal box 27 abuts against the inner face 30 of a sill 29 which is preferably welded thereto, which inner face of the sill extends over the open outer end of the pedestal box and forms an inner wall therefor, extending over the extreme outer end of the axle but normally spaced therefrom as shown in Fig. 1. The sill 29 is in the form of an angle bar, the upper flange of which is separated from the pedestal box 27 by a filler 27'.

The inner face of the hub of the pedestal box is designated 31 and is spaced from the outer end of the nut 14, but closer to the end of the nut than is the wall 30 to the end of the axle. Thus the clearance between the nut and the inner end of the bearing box is less than the clearance between the outer end of the axle and the adjacent vertical wall enclosing the axle. Therefore, outward pressure against the wheel that would tend to impose axial thrust thereto in an outward direction, would be taken by the face 31 on the hub of the pedestal box, rather than through the threads 15 and the axle to the wall 30 at the outer end of the axle.

The pressure on the nut imposed by outward movement of the wheel, is thus limited to the force required to move the axle and force the nut against the hub of the pedestal box at the face 31. As soon as these elements move into engagement, any further pressure tending to force the wheel in an outward direction will be transmitted by the nut to the pedestal box. This will not impose continuing thrust on the threads 15 between the nut and axle, which might otherwise cause wear on the threads and loosening the nut.

At the inner end of the axle, the axle portion 2 is mounted in a pedestal box 32 which surrounds the axle portion. The pedestal box 32 extends over the top of the axle and is confined in place by a bolt 33 extending through the ends thereof. A lug 34 is welded to the bottom of the axle portion 2, and is received between the sides of the axle box 32, as shown in Fig. 3, so as to regulate the rotation of the axle with respect to the pedestal box 32. As shown, the ends of the lug 34 are very slightly spaced from the adjacent sides of the pedestal box 32, thus permitting a slight amount of rotary motion of the axle relative thereto. The pedestal box 32 supports thereon the inner sill 35 which closes the outer end of the pedestal box and from the inner face of which the adjacent end of the axle is spaced.

The inward thrust of the wheel is taken by the collar 4 and the pedestal box 32. The lug 34, of course, moves with the axle, and none of the end thrust of the wheel is taken on this lug. However, the lug 34 prevents excessive rotation of the axle relative to the pedestal box.

The features herein set forth materially improve the construction of the wheel and axle assembly, the operation thereof, and prolong substantially the period of use of these before replacements are necessary.

The combination of axle, wheel and journal box are claimed in our application, Serial No. 579,546, filed February 24, 1945, now abandoned.

We claim:

1. In a wheel and axle assembly including a stub axle, a wheel having a hub journaled on the axle, said hub having an open outer end, a nut at said outer end of the hub and arranged to confine the wheel on the axle, means forming a threaded connection between the nut and the axle, a cotter pin extending into the axle at the outer side of the nut for confining the nut relative to the axle, said nut having a groove in the inner wall thereof adjacent the outer face of the nut and arranged at the outer end of the threaded connection, a felt packing ring seated in said groove between the nut and axle and arranged to prevent the entrance of water to the threaded connection, and a washer interposed between the felt packing and the cotter pin.

2. In a wheel and axle assembly including a stub axle, a nut to confine the wheel on the axle, means forming a threaded connection between the nut and the axle, a cotter pin extending into the axle at the outer side of the nut for confining the nut relative to the axle, said nut having a groove in the inner wall thereof adjacent the outer face of the nut and arranged at the outer end of the threaded connection, a felt packing ring seated in said groove between the nut and axle and arranged to prevent the entrance of water to the threaded connection, and a washer interposed between the felt packing and the cotter pin.

PERRY S. McCALLEN.
HARRY W. JONES.

REFERENCES CITED

The following references are of record in the file of this patent:

UNITED STATES PATENTS

| Number | Name | Date |
|---|---|---|
| 1,292,197 | Williams | Jan. 21, 1919 |
| 1,574,799 | Dierks | Mar. 2, 1926 |
| 1,708,608 | Edmunds | Apr. 9, 1929 |
| 1,946,619 | Furman | Feb. 13, 1934 |
| 2,348,308 | Richards | May 9, 1944 |
| 2,360,274 | Rapp | Oct. 10, 1944 |